(12) United States Patent
Sugino et al.

(10) Patent No.: US 7,402,768 B2
(45) Date of Patent: Jul. 22, 2008

(54) SWITCH STALK DEVICE

(75) Inventors: Naoki Sugino, Miyagi-ken (JP); Hiroki Suto, Miyagi-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 0 days.

(21) Appl. No.: 11/854,650

(22) Filed: Sep. 13, 2007

(65) Prior Publication Data

US 2008/0060923 A1 Mar. 13, 2008

(30) Foreign Application Priority Data

Sep. 13, 2006 (JP) .............................. 2006-248135

(51) Int. Cl.
*H01H 9/00* (2006.01)
(52) U.S. Cl. .................. 200/61.54; 200/61.27
(58) Field of Classification Search ............. 200/61.27, 200/61.3, 61.31, 61.54, 17 R, 332, 335
See application file for complete search history.

(56) References Cited

U.S. PATENT DOCUMENTS

| 5,600,110 | A | * | 2/1997 | Neubauer | ................ | 200/61.54 |
| 5,780,794 | A | * | 7/1998 | Uchiyama et al. | ........ | 200/61.54 |
| 5,831,231 | A | * | 11/1998 | Uchiyama | ................ | 200/61.54 |
| 5,859,396 | A | * | 1/1999 | Yokoyama | ................ | 200/61.54 |
| 5,861,594 | A | | 1/1999 | Akimoto et al. | | |
| 6,034,338 | A | * | 3/2000 | Uchiyama | ................ | 200/61.27 |
| 6,384,351 | B1 | * | 5/2002 | Schwartz et al. | ......... | 200/61.54 |
| 6,700,084 | B2 | * | 3/2004 | Shibata et al. | .............. | 200/252 |
| 6,903,285 | B2 | * | 6/2005 | Bosch et al. | ............. | 200/61.54 |

FOREIGN PATENT DOCUMENTS

JP          10-172389          6/1998

* cited by examiner

*Primary Examiner*—Michael A Friedhofer
(74) *Attorney, Agent, or Firm*—Brinks Hofer Gilson & Lione

(57) ABSTRACT

A thin film magnetic head includes a recording and playback element, a lead conductor layer for feeding a power to the recording and playback element, an electrically conductive bump for conductively connecting the lead conductor layer to an electrode pad for external connection, and an insulating protective layer filling between the recording and playback element and the electrically conductive bump. A thermal deformation-preventing layer composed of a material having a thermal expansion coefficient smaller than that of the insulating protective layer is disposed in the insulating protective layer in such a way as to locate between a medium-facing surface and the electrically conductive bump without being exposed at the medium-facing surface. In the resulting thin film magnetic head, protrusion of the recording and playback element toward the recording medium side can be prevented without changing the configuration of the recording and playback element nor the forming material.

8 Claims, 4 Drawing Sheets

SWITCH STALK DEVICE

RELATED APPLICATIONS

This application claims the benefit of Japanese Patent Application No. 2006-248135, filed on Sep. 13, 2006, the entire contents of which is hereby incorporated by reference.

BACKGROUND

1. Field of the Invention

The present invention relates to a stalk switch device that is provided near a steering wheel of an automobile and used for beam switching operation, turn signal operation, etc.

2. Description of the Related Art

Generally, a pair of stalk switch devices is disposed on both sides of a housing fixed to a steering column, etc., thereby constituting a combination switch. Each of the stalk switch devices is tiltably operated in a proper direction, so that beam switching of a headlamp, or switching operation of a turn signal, a wiper, etc., can be performed. For example, in the case of the stalk switch device that tiltably operates an operating lever substantially in a vertical direction to perform turn signal operation, the operating lever is tiltably operated substantially in a back-and-forth direction so that beam switching (low-beam or high-beam switching) operation or passing operation of a headlamp can be performed.

The general configuration of such a stalk switch device includes a base of the operating lever that is rotatably connected with the lever support, and the operating lever is tiltable in a predetermined operation plane with respect to the lever support. Further, the lever support is rotatably connected with a housing that is a stator member. The operating lever and the lever support are integrally tiltable in a separate operation plane orthogonal to the above operation plane. That is, the axis of rotation of the operating lever with respect to the lever support, and the axis of rotation of the operating lever and lever support with respect to the housing are substantially orthogonal to each other so that the operating lever can be tiltably operated in the two substantially orthogonal directions. A circuit board is fixed to the housing, and the circuit board extends substantially parallel to the separate operation plane. Also, a slider is disposed on the circuit board. Here, when the operating lever is tiltably operated, this slider is driven to move along the circuit board. Therefore, by the positional change of the slider, switching operation of a contact with respect to the circuit board can be performed (for example, refer to U.S. Pat. No. 5,861,594 (corresponding to JP-A-10-172389).

On the other hand, in the stalk switch device configured as described above, when the operating lever and the lever support are integrally tilted with respect to the housing (for example, at the time of turn signal operation), the operation plane of the operating lever is substantially parallel to the circuit board. Therefore, if a driving part that is provided in the lever support, etc. so as to protrude therefrom is made to engage a corresponding slider, this driving part moves along the circuit board at the time of operation. Therefore, it is relatively easy to secure a sufficient amount of movement for the slider. However, when the operating lever is tilted with respect to the lever support (for example, at the time of beam switching operation), the operation plane of the operating lever is substantially orthogonal to the circuit board, and the driving part that is provided in the operating lever so as to protrude therefrom cannot be moved along the circuit board at the time of operation. Thus, in order to have substantial movement of the slider, which is driven in engagement with the driving part, along the circuit board at the time of operation, a countermeasure becomes necessary, such as a large setting of the radius of rotation of the driving part. That is, when the operating lever is tiltably operated with respect to the lever support, the amount of movement of the slider that is engaged with the driving part considerably decreases as compared with the amount of movement of the driving part provided in the operating lever. Thus, in order to secure a sufficient amount of movement for the slider, an engagement part between the slider and the driven part should be largely separated from the rotation center of the operating lever. Such design constraint became a factor that the housing or lever support is hindered from being made small and thin. In addition, if the amount of movement of the slider needed for the switching operation of the contact is not sufficient, degradation of reliability degradation, or increase in cost will be inevitably entailed.

SUMMARY

According to an aspect of the invention, there is provided a stalk switch device including: an operating lever. A lever support is connected with a base of the operating lever to tiltably support the operating lever in a predetermined operation plane. A housing tiltably supports the lever support in a separate operation plane substantially orthogonal the operation plane. A circuit board is fixed to the housing and extends substantially parallel to the separate operation plane. A first slider having a driven part is engaged with the base of the operating lever, and is supported by the housing so as to be rotatable along the circuit board. A second slider having a link part is engaged with the first slider. A contact switching part performs a contact switching operation in the circuit board, and is supported by the housing so as to be rotatable along the circuit board. Here, a part of the first slider engaged with the link part is set to have a larger radius of rotation than the driven part, and a part of the second slider on the side of the contact switching part is set to have a larger radius of rotation than the link part.

In the stalk switch device configured in this way, when the operating lever is tiltably operated with respect to the lever support, the driven part is driven, and therefore the first slider rotates, and the link part is driven by the rotation of the first slider, and therefore the second slider rotates. Also, even if the amount of rotational movement of the driven part to be driven by the base of the operating lever is small, the amount of rotational movement of the link part of the second slider engaged with the first slider becomes larger than that of the driven part. As a result, since the amount of rotational movement of a contact switching part (sliding part) of the second slider becomes still larger than that of the driven part, it is easy to secure a sufficient amount of movement for the contact switching part at the time of such tilting operation. Further, since the first and second sliders only need to be disposed so as to overlap each other along the circuit board, and the spacing between the driven part of the first slider, and the rotation center of the operating lever is not required to be set to a particularly large value, making the housing or lever support small and thin is not hindered.

In the above configuration, if the first slider is formed so as to extend from a rotation center part of the first slider towards a rotation center part of the second slider, and a tip of the extension part is engaged with the link part, and the second slider is formed so as to extend from the rotation center part of the second slider towards the rotation center part of the first slider, and the total length of the extension part of the second slider is set to be larger than the total length the extension part of the first slider, the amount of rotational movement of the driven part can be efficiently increased by a two-step rotary link mechanism obtained by connecting the first and second sliders, and the size of the two-step rotary link mechanism in plan view can be suppressed. Therefore, the housing or lever support can made small more easily.

Further, in the above configuration, if shaft holes are bored in the rotation center part of the first slider, and the rotation center part of the second slider, respectively, and a first supporting shaft fitted into the shaft hole of the first slider and a second supporting shaft fitted into the shaft hole of the second slider are provided so as to project from the surface of the housing that faces the circuit board, the height of a two-step rotary link mechanism obtained by connecting the first and second sliders can be suppressed, and the two-step rotary link mechanism can be compactly received now in the housing. Therefore, the housing or lever support can made thin more easily.

According to the stalk switch device of the invention, when the operating lever is tiltably operated with respect to the lever support, the first and second slider are adapted to rotate in an interlocking manner so as to perform switching operation of a contact. Thus, even if the amount of rotational movement of the driven part of the first slider to be driven by the base of the operating lever is small, the amount of rotational movement of the link part of the second slider engaged with the first slider becomes larger than that of the driven part. As a result, since the amount of rotational movement of the contact switching part of the second slider becomes still larger than that of the driven part, it is easy to secure a sufficient amount of movement for the contact switching part at the time of such tilting operation. Further, since the first and second sliders only need to be disposed along the circuit board, and the spacing between the driven part of the first slider, and the rotation center of the operating lever is not required to be set to a particularly large value, making the housing or lever support small and thin is not hindered.

DESCRIPTION OF THE EMBODIMENTS

Figure 1:
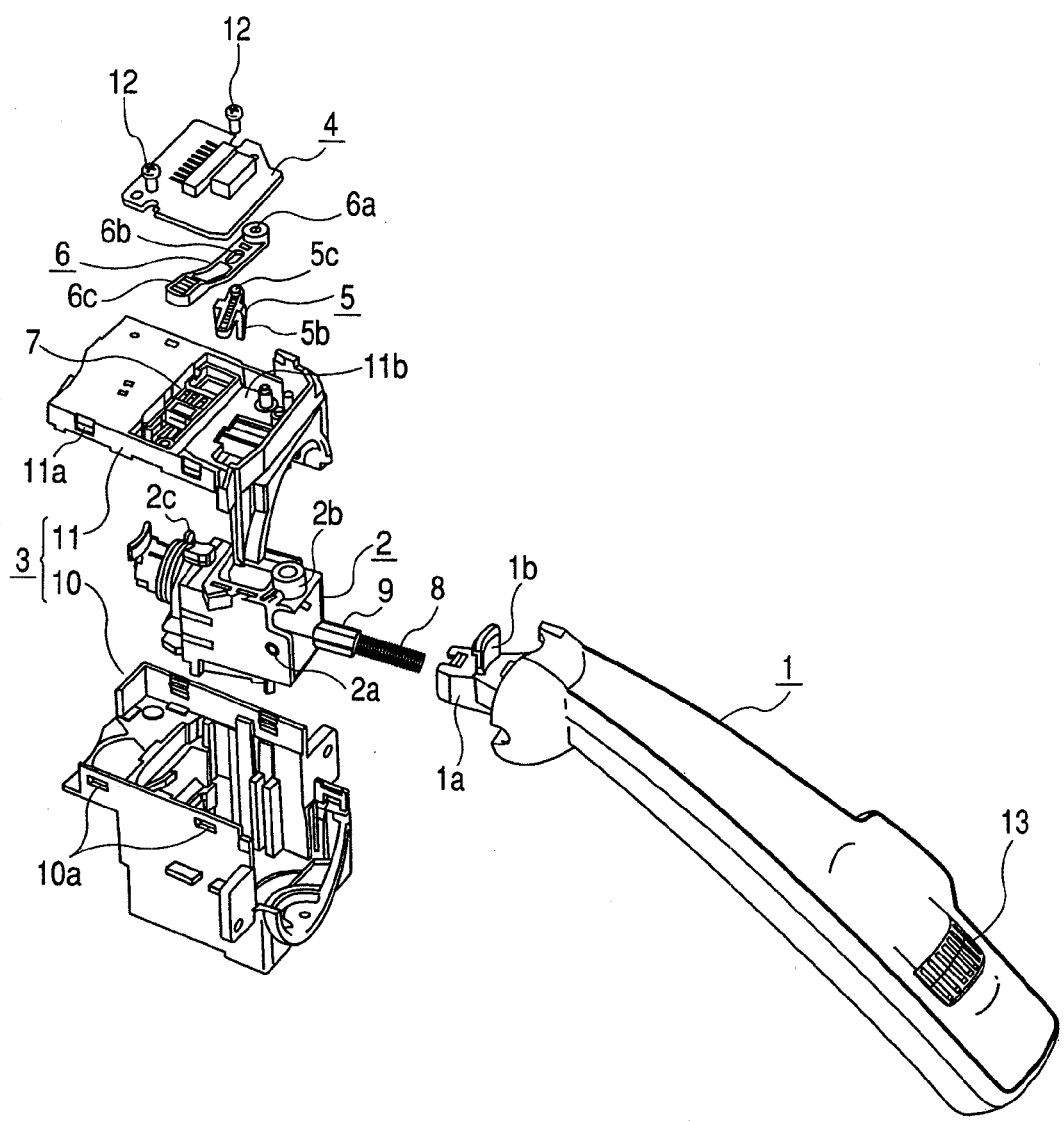
FIG. 1 is an exploded perspective view of a stalk switch device according to an embodiment.
Figure 2:
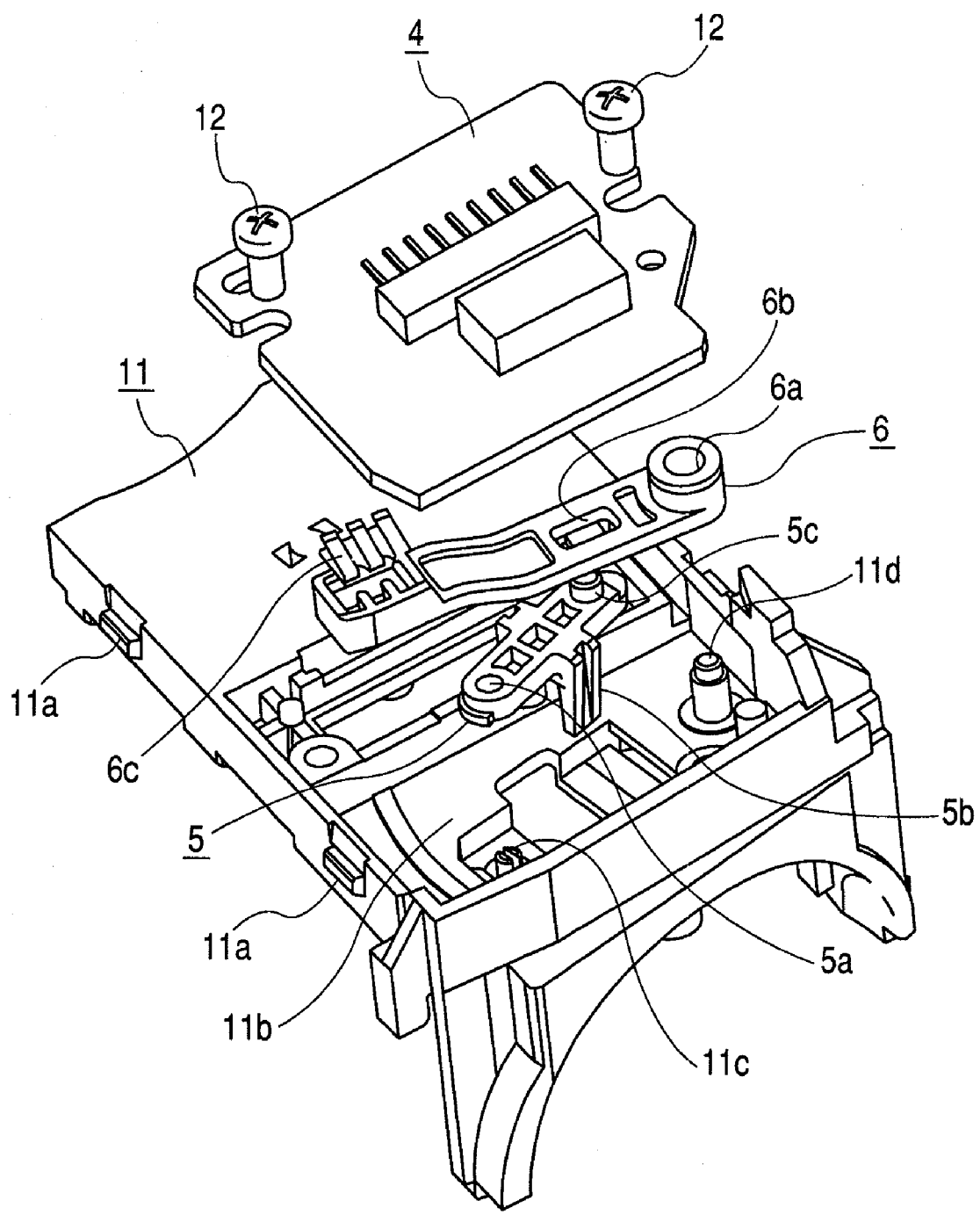
FIG. 2 is an exploded perspective view showing principal parts of FIG. 1 in an enlarged manner.
Figure 3:
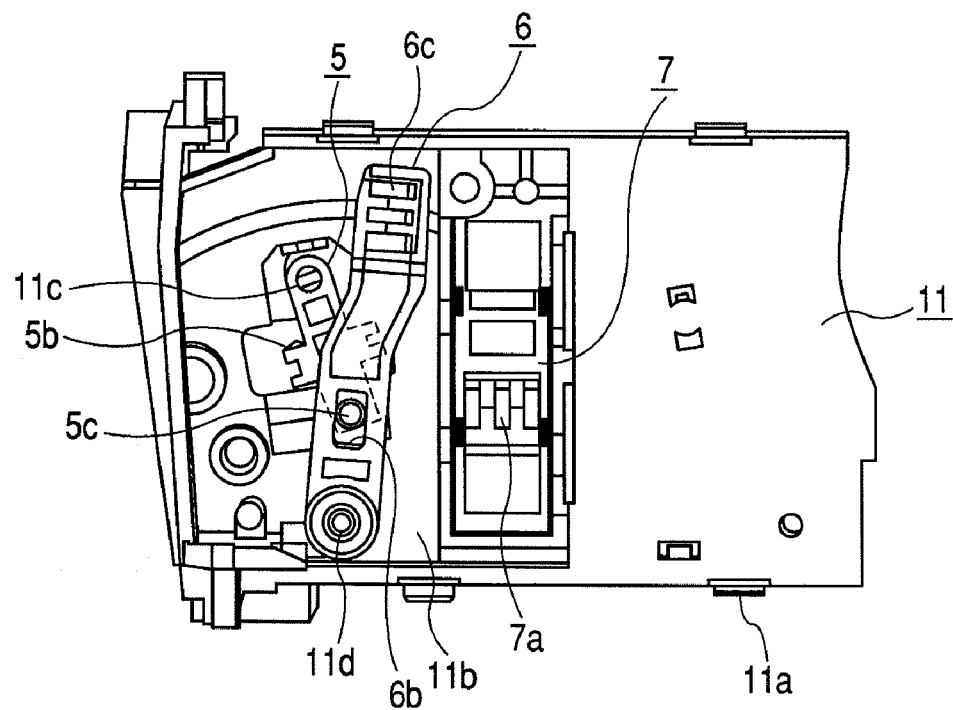
FIG. 3 is a plan view of the principal parts showing the engagement between a pair of sliders provided in the stalk switch device during non-operation thereof.
Figure 4:
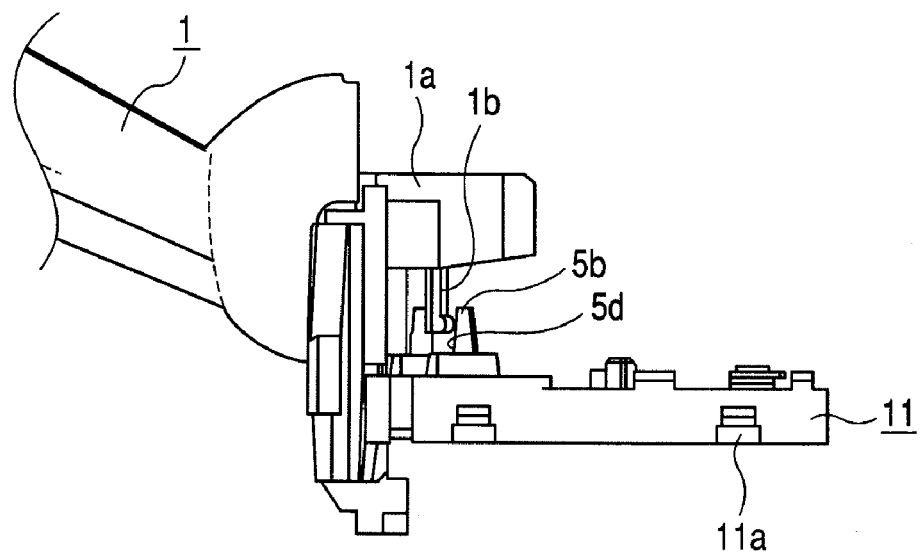
FIG. 4 is a side view of the principal parts corresponding to FIG. 3.
Figure 5:
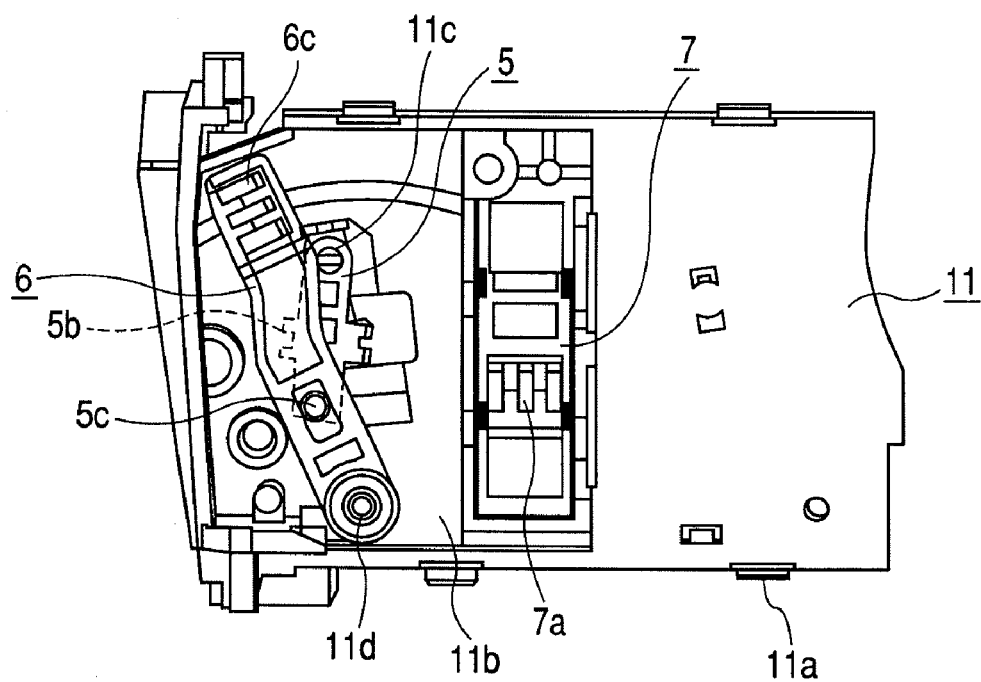
FIG. 5 is a plan view of the principal parts showing the engagement between the sliders of the stalk switch device at the time of tilting operation thereof.
Figure 6:
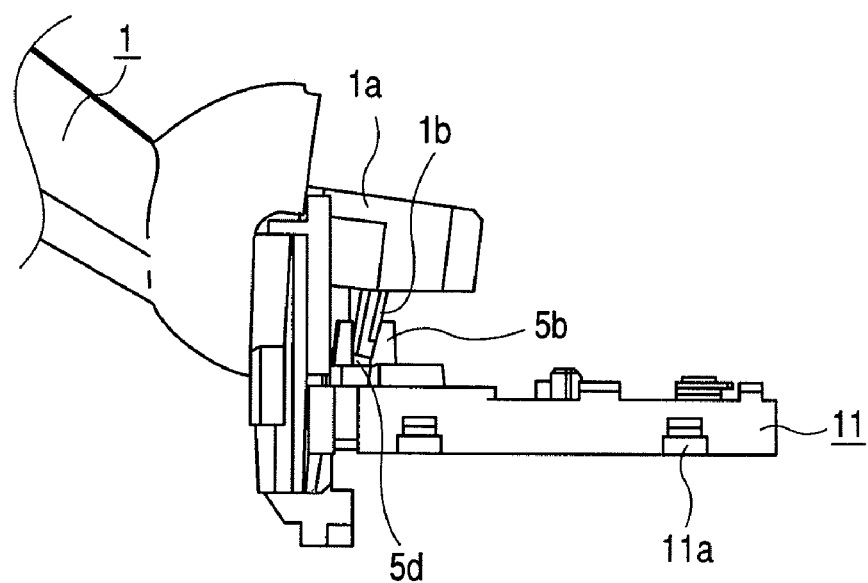
FIG. 6 is a side view of the principal parts corresponding to FIG. 5.

An embodiment of the invention will be described with reference to the accompanying drawings in which FIG. 1 is an exploded perspective view of a stalk switch device according to an embodiment, FIG. 2 is an exploded perspective view showing principal parts of FIG. 1 in an enlarged manner, FIG. 3 is a plan view of the principal parts showing the engagement between a pair of sliders provided in the stalk switch device at the time of non-operation thereof; FIG. 4 is a side view of the principal parts corresponding to FIG. 3, FIG. 5 is a plan view of the principal parts showing the engagement between the sliders of the stalk switch device during tilting operation thereof; and FIG. 6 is a side view of the principal parts corresponding to FIG. 5.

A stalk switch device shown in these drawings mainly includes an operating lever 1, a lever support 2 that receives and tiltably supports a base 1a of the operating lever 1, a housing 3 that receives and tiltably supports the lever support 2, a circuit board 4 that is fixed to the housing 3, a first slider 5 and a second slider 6 that operate when the operating lever 1 is tiltably operated with respect to the lever support 2, a third slider 7 that operates when the operating lever 1 and the lever support 2 are tiltably operated integrally, and a cam mechanism including a coiled spring 8 and a presser 9. Here, the housing 3 is assembled by a main case 10 that journals the lever support 2, and a case body 11 that fixes the circuit board 4 using screws 12. Further, a rotary knob 13 is provided near a tip of the operating lever 1, and a detecting member (not shown) for detecting that this rotary knob 13 has been rotationally operated is built in the operating lever. Also, the housing 3 is fixed to a steering column side of an automobile so that the operating lever 1 can be tiltably operated in two directions that are substantially orthogonal to each other.

A long part 2 of the operating lever 1, except the base 1a, projects largely from the lever support 2, and a rotating shaft (not shown) that is provided in the base 1a of the operating lever is journalled to a bearing 2a of the lever support 2. A tongue-like driving part 1b is provided at the base 1a of the operating lever 1 so as to protrude therefrom, and the driving part 1b is engaged with the first slider 5. Further, the coiled spring 8 for elastically energizing the presser 9 is received in the base 1a of the operating lever 1. A part of the cylindrical rotary knob 13 is exposed to the long part of the operating lever 1, and the rotary knob 13 can be rotationally operated in the peripheral direction. The operating lever 1 is supported by the lever support 2 so that it can be tilted along a plane (first operation plane) that is orthogonal to the axis of the rotating shaft.

A rotating shaft 2b journalled to the housing 3 is provided at the lever support 2 so as to project therefrom so that the operating lever 1 and the lever support 2 can be integrally tilted along a plane (second operation plane) that is orthogonal to the axis of the rotating shaft 2b. As apparent from the positional relationship between the bearing 2a of the lever support 2 and the rotating shaft 2b that are shown in FIG. 1, the second operation plane is a plane that is substantially orthogonal to the first operation plane. The operating lever 1 is tiltably operated integrally with the lever support 2 along the second operation plane so that, for example, turn signal operation can be performed. The operating lever 1 is operated with respect to the lever support 2 along the first operation plane so that, for example, beam switching operation or passing operation of a headlamp can be performed. Further, a cam surface (not shown) is formed in an inner wall of the lever support 2, and the presser 9 that is elastically energized by the coiled spring 8 comes into elastic contact with the cam surface. The lever support 2 is disposed in a space in the housing 3 surrounded by the main case 10 and the case body 11 to journal the operating lever 1.

The housing 3 is assembled by the snap fitting that a locking claw 11a of the case body 11 is fitted into a locking hole 10a of the main case 10. A recess 11b is defined on the side of the case body 11 opposite to the side where the lever support 2 is disposed, and the circuit board 4 disposed so as to cover the recess 11b is fixed to the case body 11 using the screws 12. Further, a first supporting shaft 11c, serving as the rotating shaft of the first slider 5, and a second supporting shaft 11d, serving as the rotating shaft of the second slider 6, are formed in the surface of the case body 11 facing the circuit board 4. The pivots 11c and 11d project into the recess 11b. In addition, the circuit board 4 extends substantially parallel to the second operation plane, and a contact pattern (not shown) is formed on the surface of the circuit board 4 that faces the recess 11b.

The first slider 5 is provided with a shaft hole 5a into which the first supporting shaft 11c is fitted. A driven part 5b is engaged with the driving part 1b of the operating lever 1, and a link shaft 5c is engaged with the second slider 6. The first slider 5 is rotatable along the circuit board 4 with the first supporting shaft 11c as a rotating shaft. As shown in FIGS. 3 and 5, the part of the first slider 5 except the driven part 5b is disposed in the recess 11b of the case body 11, and extends linearly to the side where the second supporting shaft 11d exists from a rotation center part in which the shaft hole 5a is bored. A link shaft 5c projects from a tip of the extension part towards the circuit board 4. Further, as shown in FIGS. 4 and 6, the driven part 5b projects towards the base 1a of the operating lever 1, and the driving part 1b is slidably inserted into a groove 5d formed in the driven part 5b. Also, when the operating lever 1 is tiltably operated along the first operation plane, the driving part 1b will drive the driven part 5b. Therefore, the first slider 5 rotates along the circuit board 4 about the first supporting shaft 11c. However, when the operating lever 1 is not tiltably operated along the second operation plane, the driven part 5b is not driven only by the driving part 1b being moved in the groove 5d. In a plan view of the first slider 5, the driven part 5b is located about halfway of the shaft hole 5a and the link shaft 5c. Therefore, when the first slider 5 is rotationally driven by the driving part 1b, the radius of rotation of the link shaft 5c will become larger than the driven part 5b.

The second slider 6 is provided with a shaft hole 6a into which the second supporting shaft 11d is fitted. A link part 6b, in the shape of a long hole, is engaged with the link shaft 5c of the first slider 5, and a sliding part 6c comes into sliding contact with the contact pattern (not shown) of the circuit board 4. The second slider 6 is disposed in the recess 11b of the case body 11 so as to face the circuit board 4, and rotatable along the circuit board 4 with the second supporting shaft 11d as a rotating shaft. As shown in FIGS. 3 and 5, the second slider 6 extends to the side where the first supporting shaft 11c exists from a rotation center part in which the shaft hole 6a is bored, and the sliding part 6c is fixed to a tip of this extension part. Here, the total length of the second slider 6 is set to be longer than the total length of the extension part of the first slider 5 arranged in the recess 11b similarly to the second slider. The first and second sliders 5 and 6 are disposed so as to overlap each other in the recess 11b. Thus, when the first slider 5 is rotationally driven by the driving part 1b of the operating lever 1, the link shaft 5c will drive the inner wall of the link part 6b, and therefore the second slider 6 will be rotated in an interlocking manner.

The third slider 7 is reciprocally supported by the case body 11 so that it can reciprocate in the vertical direction of FIGS. 3 and 5, and has a sliding part 7a that comes into sliding contact with the contact pattern (not shown) of the circuit board 4. The third slider 7 is driven by a driving part 2c (refer to FIG. 1) of the lever support 2 when the operating lever 1 is tiltably operated along the second operation plane such that it moves linearly along the circuit board 4.

Next, the operation of the stalk switch device configured in this way will be described. When the operating lever 1 is not tiltably operated with respect to the lever support 2, the first and second sliders 5 and 6 are in their neutral positions shown in FIG. 3 or 4. In this state, when the operating lever 1 is tiltably operated along the first operation plane, the operating lever 1 will rotate in the clockwise direction or counterclockwise direction of FIG. 4 with respect to the lever support 2. Thus, the driving part 1b rotates in the same direction, whereby the driven part 5b of the first slider 5 is pushed in to the left or right of FIG. 4. For example, if the operation of rotating the operating lever 1 in the clockwise direction of FIG. 4 is performed, the driving part 1b will push in the driven part 5b to the left of FIG. 4, and shift to a state shown in FIG. 6. Therefore, the first slider 5 rotates to a position shown in FIG. 5 from a position shown in FIG. 3 about the first supporting shaft 11c within the recess 11b. As a result, since the second slider 6 driven by the link shaft 5c of the first slider 5 rotates to the position shown in FIG. 5 from the position shown in FIG. 3 about the second supporting shaft 11d, the sliding part 6c largely changes a contact position with a corresponding contact pattern of the circuit board 4, thereby performing contact switching operation. Consequently, for example, a headlamp can be switched to a high beam from a low beam. Further, when the operation of rotating the operating lever 1 in the counterclockwise direction of FIG. 4 has been performed, the driven part 5b is pushed in to the right of FIG. 4. Therefore, the first slider 5 and the second slider 6 rotate in directions reverse to the above directions from the neutral positions, respectively. Then, for example, a contact switching operation of a switching circuit for passing can be performed by the positional change of the sliding part 6c accompanying such rotation.

In addition, when the direction of the operating lever 1 with respect to the lever support 2 is changed in this way, the presser 9 that is elastically energized by the coiled spring 8 changes the position of elastic contact position with the cam surface. Therefore, for example, at the time of beam switching operation, the presser 9 can be moved from a predetermined valley of the cam surface to another valley, thereby generating a click feeling, at the time of passing operation, the presser 9 can be moved to a peak from the predetermined valley of the cam surface a, and after operation, the presser can be automatically returned to its original position.

Further, when the operating lever 1 is tiltably operated along the second operation plane substantially parallel to the circuit board 4, the operating lever 1 and the lever support 2 rotate about the rotating shaft 2b, and accordingly, the third slider 7 driven by the driving part 2c of the lever support 2 moves linearly along the circuit board 4. As a result, since the sliding part 7a of the third slider 7 changes a contact position with a corresponding contact pattern of the circuit board 4, for example, the contact switching operation of a switching circuit for turn signals can be performed.

Further, when the rotary knob 13 provided in the operating lever 1 is rotationally operated in the peripheral direction, a detecting member (not shown) that is built in the operating lever 1 will be driven by the rotary knob 13. Therefore, for example, the contact switching operation of a switching circuit for dimming of a headlamp can be performed.

As describe above, the stalk switch device according to this embodiment adopts a two-step rotary link mechanism in which, when the operating lever 1 is tiltably operated with respect to the lever support 2, the driven part 5b is driven to rotate the first slider 5, the link part 6b is driven by rotation of the first slider 5 to rotate the second slider 6. Also, even if the amount of rotational movement of the driven part 5b to be driven by the base 1a (driving part 1b) of the operating lever 1 is small, the amount of rotational movement of the link part 6b of the second slider 6 engaged with the first slider 5 becomes larger than that of the driven part. As a result, since the amount of rotational movement of the sliding part 6c that is a contact switching part of the second slider 6 becomes still larger than that of the driven part, it is easy to secure a sufficient amount of movement for the sliding part 6c at the time of such tilting operation. Further, since the first and second sliders 5 and 6 only need to be disposed so as to overlap each other along the circuit board 4, and the spacing between the driven part 5b of the first slider 5, and the rotation center of the operating lever 1 is not required to be set to a particularly large value, making the housing 3 or the lever support 2 small and thin is not hindered.

Further, in this stalk switch device, the first slider 5 extends to the side where the second supporting shaft 11d exists from a rotation center part in which the shaft hole 5a is bored, and the link shaft 5c is provided at a tip of the extension part. Also, the second slider 6 extends to the side where the first supporting shaft 11c exists from a rotation center part in which the shaft hole 6a is bored, and the total length of the extension part is set to be longer than the total length of the extension part of the first slider 5. Accordingly, the amount of rotational movement of the driven part 5b can be efficiently increased by a two-step rotary link mechanism obtained by connecting the first and second sliders 5 and 6. Also, the size of the two-step rotary link mechanism in plan view can be suppressed. This configuration is also advantageous for miniaturization of the housing 3 or lever support 2.

Further, in this stalk switch device, the shaft holes 5a and 6a are bored in the rotation center part of the first slider 5, and the rotation center part of the second slider 6, respectively. Also, the first supporting shaft 11c fitted into the shaft hole 5a of the first slider 5 and the second supporting shaft 11d fitted into the shaft hole 6a of the second slider 6 are provided so as to project from the surface of the case body 11 of the housing 3 that faces the circuit board 4. Accordingly, the height of a two-step rotary link mechanism obtained by connecting the first and second sliders 5 and 6 can be suppressed, and the two-step rotary link mechanism can be compactly received now in the recess 11b of the case body 11. Consequently, this configuration is also advantageous for making the housing 3 or lever support 2.

In addition, although the above embodiment has been described that the pivots 11c or 11d serving as the rotating shaft of the first slider 5 or second slider 6 is provided in the housing 3 so as to project therefrom, it is also possible to provide these pivots in the first and second slider 5 and 6 so as to project there from, respectively. Further, the concavo-convex relationship between the link shaft 5c of the first slider 5, and the link part 6b of the second slider 6 may be reversed. Further, a configuration in which contact switching parts other than the sliding part are provided in the second slider 6 may be adopted.

The invention claimed is:

1. A stalk switch device comprising:
an operating lever;
a lever support connected with a base of the operating lever to tiltably support the operating lever in a predetermined operation plane;
a housing that tiltably supports the lever support in a separate operation plane substantially orthogonal the operation plane;
a circuit board that is fixed to the housing and extends substantially parallel to the separate operation plane;
a first slider having a driven part that is engaged with the base of the operating lever, and is supported by the housing so as to be rotatable along the circuit board; and
a second slider having a link part that is engaged with the first slider, and a contact switching part that performs a contact switching operation in the circuit board, and that is supported by the housing so as to be rotatable along the circuit board, wherein a part of the first slider engaged with the link part is set to have a larger radius of rotation than the driven part, and a part of the second part on the side of the contact switching part is set to have a larger radius of rotation than the link part.

2. The stalk switch device according to claim 1, wherein the first slider extends from a rotation center part of the first slider towards a rotation center part of the second slider, and a tip of the extension part engages with the link part, and the second slider extends from the rotation center part of the second slider towards the rotation center part of the first slider, and the total length of the extension part of the second slider is set to be larger than the total length the extension part of the first slider.

3. The stalk switch device according to claim 2,
wherein shaft holes are disposed in the rotation center part of the first slider, and the rotation center part of the second slider, respectively, and a first supporting shaft fitted into the shaft hole of the first slider and a second supporting shaft fitted into the shaft hole of the second slider are provided so as to project from the surface of the housing that faces the circuit board.

4. The stalk switch device according to claim 1,
wherein shaft holes are disposed in the rotation center part of the first slider, and the rotation center part of the second slider, respectively, and a first supporting shaft fitted into the shaft hole of the first slider and a second supporting shaft fitted into the shaft hole of the second slider are provided so as to project from the surface of the housing that faces the circuit board.

5. The stalk switch device according to claim 1,
wherein a driving part is provided so as to protrude from the base, and the driven part is formed with a groove that is engaged with the driving part.

6. The stalk switch device claim 1,
wherein the link part is a concave part or convex part, and the first slider is formed with a convex part or concave part that is engaged with the concave part or convex part.

7. The stalk switch device according to claim 6,
wherein the link part is a long hole, and a link shaft is provided so as to project from the first slider.

8. The stalk switch device claim 1,
wherein turn signal operation is performed when the operating lever is tilted in the predetermined operation plane.

* * * * *